United States Patent
Petzke (10) Patent No.: US 10,935,136 B2
(45) Date of Patent: Mar. 2, 2021

(54) GATOR RING SEALING STRUCTURE FOR VACUUM CHAMBERS

(71) Applicant: Jeff Petzke, Houston, TX (US)

(72) Inventor: Jeff Petzke, Houston, TX (US)

( * ) Notice: Subject to any disclaimer, the term of this patent is extended or adjusted under 35 U.S.C. 154(b) by 9 days.

(21) Appl. No.: 15/949,069

(22) Filed: Apr. 9, 2018

(65) Prior Publication Data

US 2019/0309849 A1    Oct. 10, 2019

(51) Int. Cl.
*F16J 15/08* (2006.01)

(52) U.S. Cl.
CPC .................. *F16J 15/0818* (2013.01)

(58) Field of Classification Search
CPC ...... F16J 15/0818; B65D 53/00; B65D 53/02; B65D 51/16; E06B 7/2303
USPC ................ 220/212, 378, 367.1, 366.1, 319; 277/645, 644, 628; 141/368
See application file for complete search history.

(56) References Cited

U.S. PATENT DOCUMENTS

| | | | | |
|---|---|---|---|---|
| 2,339,048 A | * | 1/1944 | Bixier | F04B 39/108 137/512.3 |
| 3,355,057 A | * | 11/1967 | Mackenzie | F16J 15/061 220/378 |
| 2011/0011788 A1 | * | 1/2011 | Bradshaw | E21B 21/06 210/323.1 |

* cited by examiner

*Primary Examiner* — Robert J Hicks
(74) *Attorney, Agent, or Firm* — Delphine James (57) ABSTRACT

A sealing structure for a vacuum pressure chamber is provided. In one embodiment, an annular ring sealing structure seats between opposing gaskets. The annular ring sealing structure is then disposed between the lid and vessel of the vacuum pressure chamber wherein the lid is operationally coupled to the vessel of the vacuum pressure chamber. Various components interconnect with the annular ring sealing structure thereby preventing the high cyclic failure of the vacuum chamber vessel.

18 Claims, 9 Drawing Sheets

GATOR RING SEALING STRUCTURE FOR VACUUM CHAMBERS

BACKGROUND

This Application Claims the Benefit of XXX

The present invention relates to vacuum chambers and in particular to a sealing structure to secure the lid to the vessel or the container of the vacuum chamber.

A vacuum chamber is a sealed rigid container from which air and other gases are removed by a vacuum pump which results in a low pressure environment within the chamber, commonly referred to as a vacuum. This allows for processes such as vacuum drying or vacuum coating.

Vacuum chambers are typically made of metals made of varying wall thickness, resistivity and permeability of the material used. Only some materials are suitable for vacuum use. Currently, the structure of the vacuum chamber consists of a container, lid and gaskets and controls assembly. The controls are mounted on the lid by drilling holes in the lids or mounted in the container by drilling the holes in the vertical side. The lids can be made of glass or plastic type material.

In the embodiments utilized in the industry, chambers often have multiple ports, covered with vacuum flanges, to allow instruments or windows to be installed in the walls of the chamber. In low to medium-vacuum applications these are sealed with elastomer o-rings. In higher vacuum, the flanges have hardened steel knives welded onto them, which cut into a copper gasket when the flange is bolted on. The piercings in the chambers causes high cyclic failures in the vacuum chambers used in the industry today.

What is needed is a sealing structure that limits the damage of the container and the lid during the vacuum processing of the products therein.

SUMMARY OF THE INVENTION

One object of this invention is to provide a sealing ring structure between the lid and vacuum chamber for stabilizing or impregnation of chemicals.

Another object of the present invention is to address the problems of mounting controls on the side of the container of the vacuum chamber thereby eliminating the process of drilling a hole in the side of the chamber.

Another object of the present invention is to maintain a sealing mechanism that prevents penetration of either the chamber or lid.

Another object of the present invention to prevent the high cyclic failure due to vacuum induced lid deflection.

Another object of the present invention is to prevent products within the chamber from damaging the chamber or the lid.

The present invention utilizes a heavy ring with a gasket or multiple gaskets placed between a tempered glass lid and the container with a fitting mounted in its either horizontal or vertical side. The ring is connected to a remote control center which includes the valves, exhaust filter and gauge mounted in line between the ring fitting and the pump apparatus. The present invention protects the vacuum chamber from damage by using remote controls with a trap and tempered glass lid thereby preventing high cyclic failures.

These and other objects and features of the present invention will become more apparent from the following description taken in conjunction with the accompanying drawings which illustrate specific embodiments of the invention.

DETAILED DESCRIPTION OF THE INVENTION

Referring to the drawings, there is illustrated the present invention a sealing structure (21) to secure the lid (10) to the container (30) of a vacuum chamber. The sealing structure (21) comprises a top gasket, a bottom gasket with a sealing member disposed therebetween. The lid which sits atop the top gasket should be made of a transparent material to gauge the pressurization process.

Figure 1:
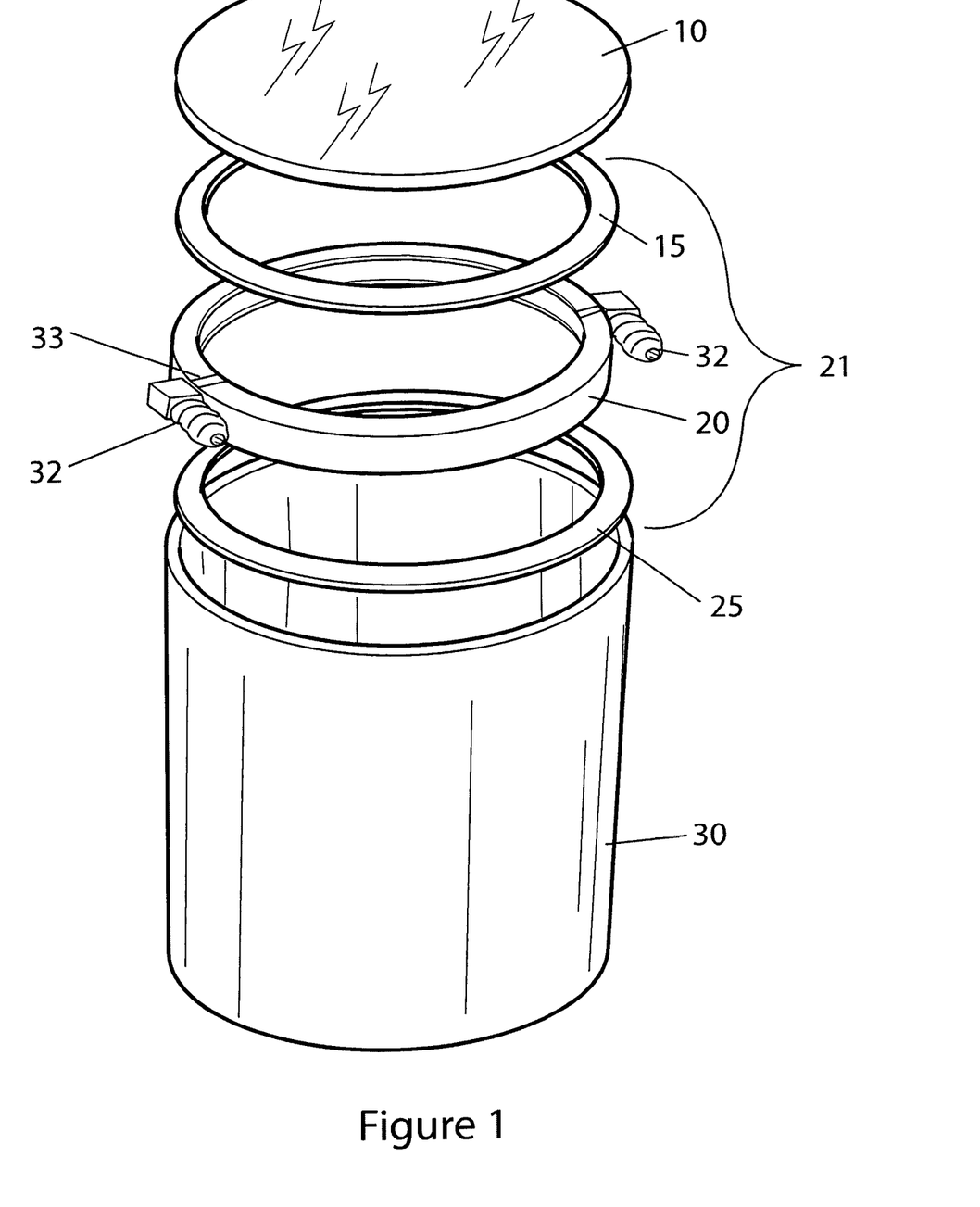
FIG. 1 is an exploded perspective view of the Sealing control ring present invention.

In the illustrated embodiment in FIG. 1, the container (30) comprises a surrounding wall with a top opening with a peripheral circumference that forms a bottom face for receiving the bottom gasket (25) thereon. As depicted the container (30) comprises a bottom wall with a surrounding wall that extends linearly upward to a rim. The container (30) can be made of metals with a thickness that resist the permeability of the products contained therein. The thickness of the walls can be at least two inches. Suitable materials can consist of stainless steel, aluminum, mild steel, brass, high density ceramic, glass, acrylic or another suitable metal material with the capability of withstanding the pressure. Additionally, the container (30) can have alternative shapes wherein the lid (10), sealing structure (21) and gaskets (25, 15) would have a complementary configuration to seal therewith. The width and depth of the sealing member varies based upon the thickness of the vacuum chamber. The width and depth should be at least 1 inch. Top and bottom gasket should be made of a chemical resistant material.

In the preferred embodiment, the lid (10) is made of tempered glass which is transparent to allow the user to gauge the vacuum process within the chamber. The lid (10) in one embodiment can be made of borosilicate glass. The peripheral circumference of the bottom surface of the lid forms an engaging surface for receiving the top gasket (15). Additionally, another suitable transparent strong material can be utilized.

Figure 8:
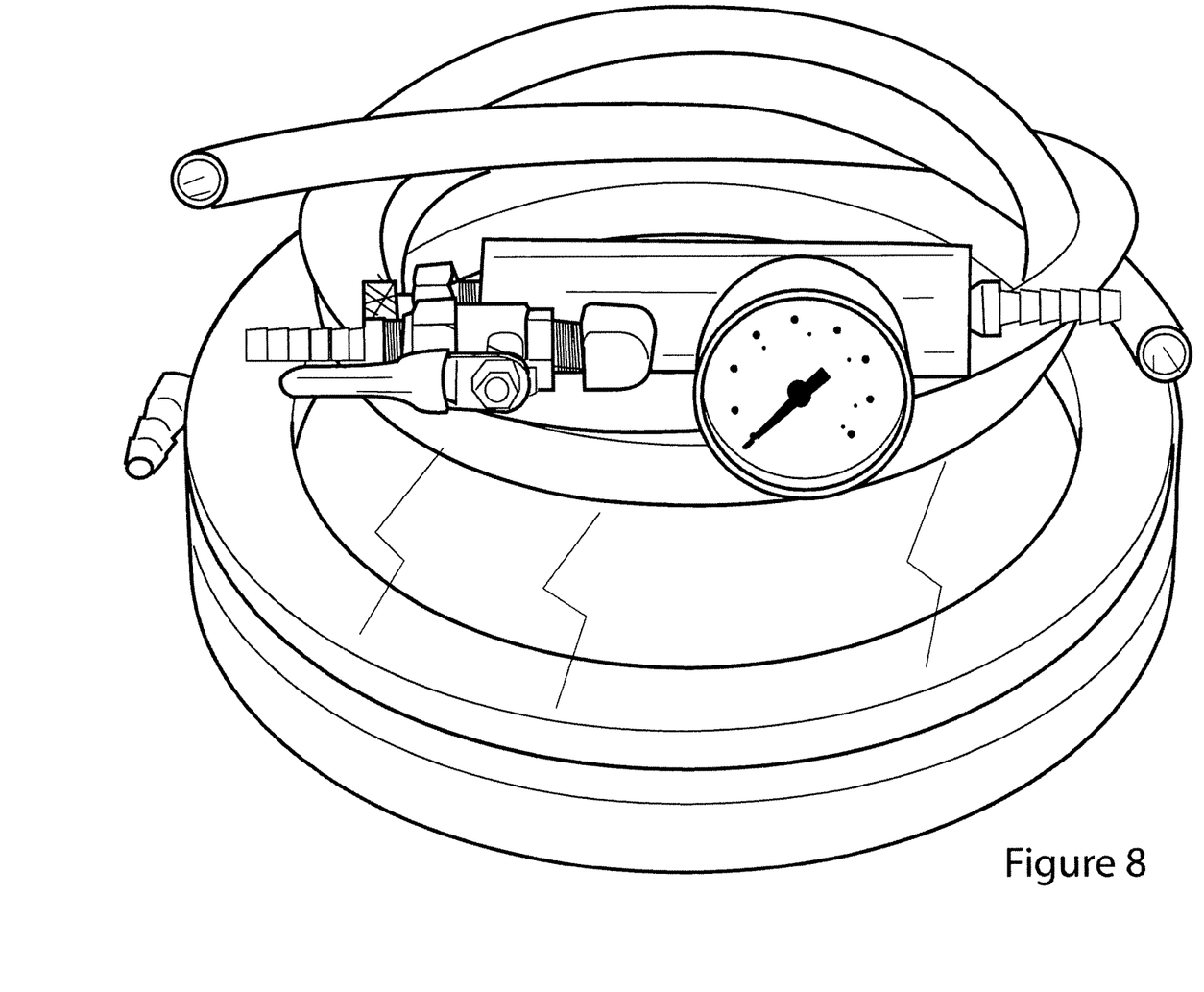
FIG. 8 is a an alternative view of one embodiment of the sealing structure
Figure 9:
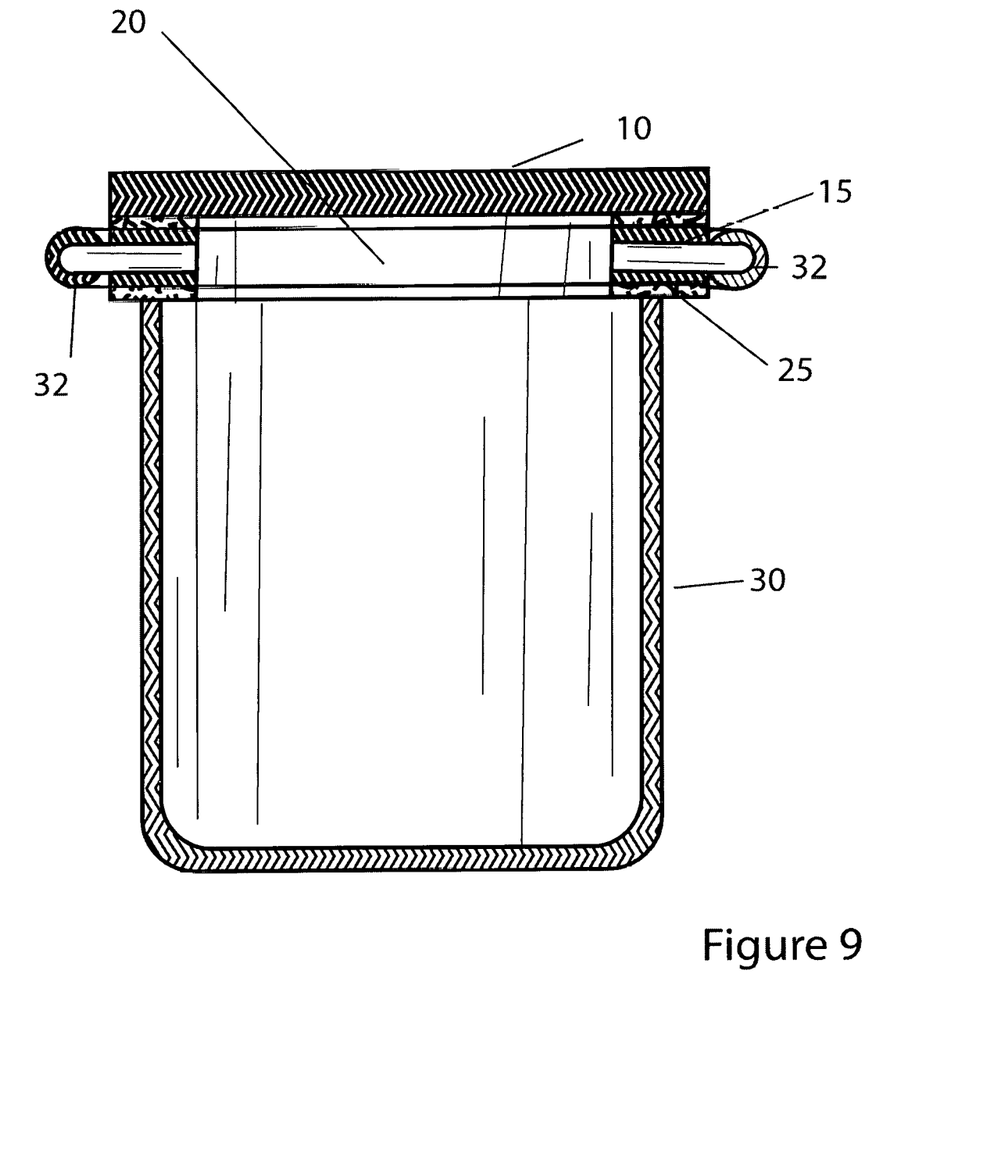
FIG. 9 is a cross-sectional view of the sealing structure.

The sealing structure (21) of the present invention comprises a sealing member (20) sandwiched between a top gasket (15) and a bottom gasket (25). In the preferred embodiment as depicted in FIG. 1, sealing member (20) is an annular ring. The sealing member has a predetermined side depth and a predetermine width which allows for a channel to be formed internally within the sealing member (20). FIGS. 8 and 9 are alternative sealing structures. In one embodiment the lid and the sealing structure have equivalent diameters and in the other embodiment the lid has a slightly smaller diameter than the sealing structure. Plastic type material especially has the cyclic failure issues and can fail with hazing and cracking due to a chemical reaction during use. This is especially true when the vacuum is used with certain chemicals of a container that has a significant failure rate due to leakage and migration of the contents of the container into the controls and pump apparatus. By mounting the controls on the side of the vessel you lose the ability to use fully the size of the vessel. To solve the aforementioned problem, which causes a high cyclic failure to occur, in the present invention, the controls are mounted to the thick sealing member (20) through the vacuum flange ports as depicted in (GV-1). Vacuum flange ports can be vertically or horizontally mounted to an outer surface area of sealing member (20). The sealing member can be made of Elastomer or another suitable member. Vacuum flange port connects to a passageway formed by a bore that extends through the width of the sealing member.

As illustrated the top face of the top gasket (15) engages with the circumference of the bottom surface of the lid (10) and the bottom face of the top gasket (15) engages with the circumference of the top surface of the sealing member. Additionally, the top face of the bottom gasket (25) engages with the circumference of the bottom surface of the sealing member (20) and the bottom face of the bottom gasket (25) engages with the circumference of the opening of the container. The top (15) and bottom gasket (25) can be made elastomer or another suitable material and the thickness can be at least ½ inch to allow for sealing the vacuum chamber. The gasket engaging surfaces should be designed with a channel for receiving the top (15) and bottom gasket (25) thereby securing and holding the gaskets in place sealing against leakage under pressure when in use.

In use, the opposing faces of the sealing member (20) channel forms a channel for receiving the top and bottom gaskets therein. As the low pressure is created inside the vacuum chamber (30) the top and bottom gaskets are compressed into the circumferential channels to form a seal that prevents leakages during vacuum processing. The system can be manufactured with or without circumferential channels.

Figure 3:
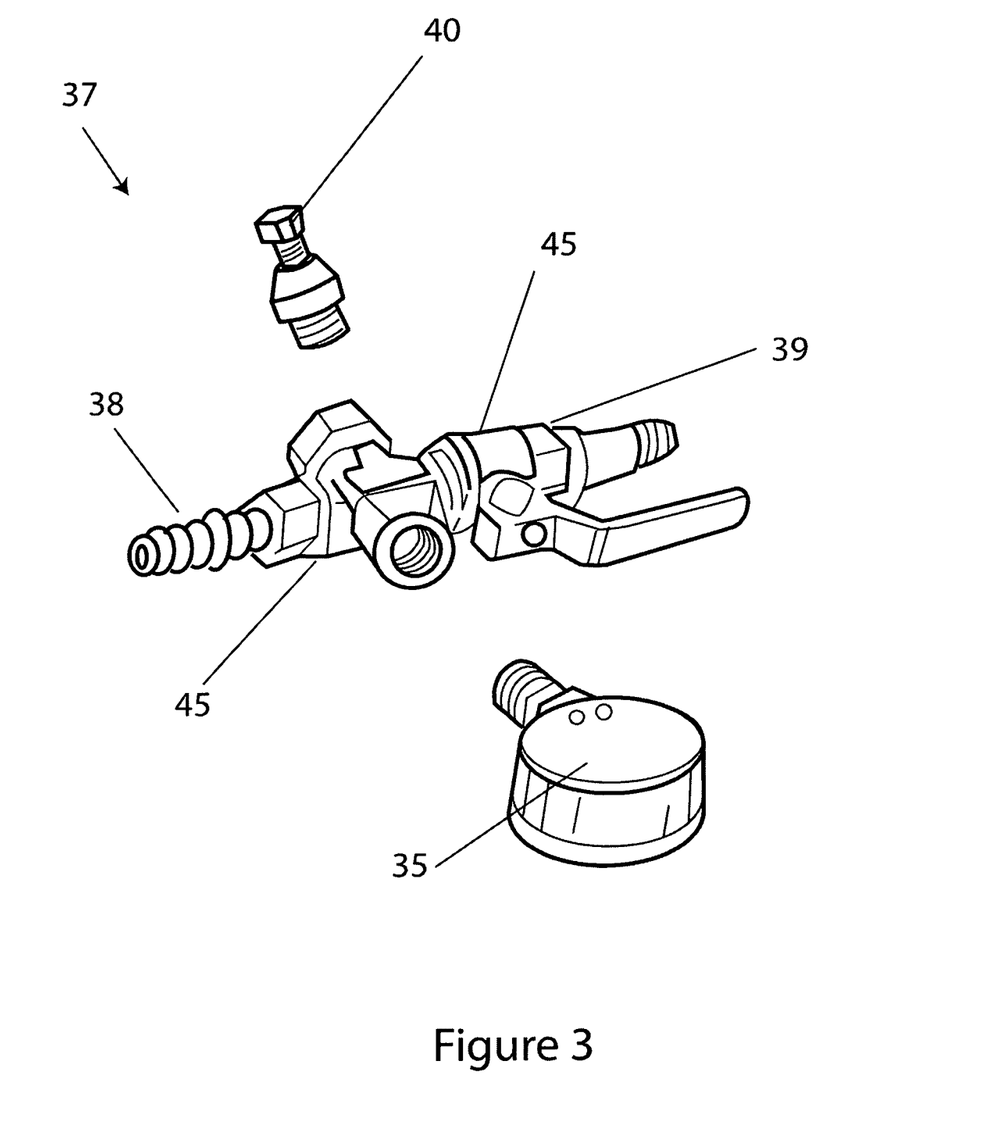
FIG. 3 is a cutaway view of the control manifold.
Figure 5:
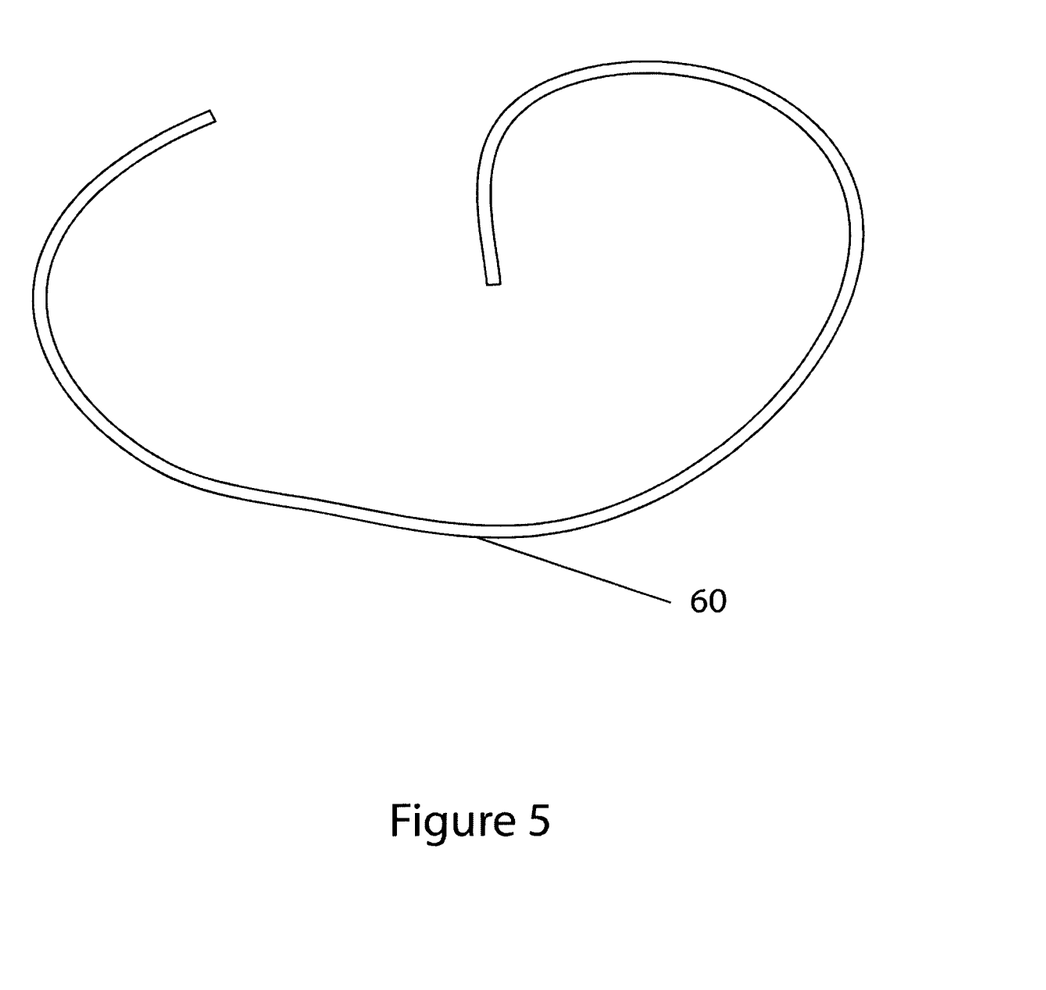
FIG. 5 is a cutaway view of the tubular hose.

The present invention comprises an sealing member (GV-1, 20) with at least one flanged port that supports operational connections with the control manifold (GV-2, 37) illustrated in FIG. 3. Depicted in FIG. 5, is hose that is a flexible hollow tubing designed to carry the fluids to or from the vacuum chamber (30). As illustrated in FIG. 3, the control manifold (GV-2, 37) comprises a manifold body (GV-C, 45) that supports the connections to gauge (GV-A, 35), relief valve (GV-B, 40), barbed fitting (GV-D, 38), and ball valve (GV-A, 39). Gauge (GV-A, 35) is the device that provides a mechanism to measure and display the pressure within the vacuum chamber. Relief valve (GV-B, 40) provides a mechanism to control or to limit the pressure within the vacuum chamber. Barbed fitting (GV-D, 38) provides the connections to the manifold body (GV-C, 45). Ball valve (GV-E, 39) provides a means for controlling the flow of fluid from and into the chamber. Tubular hose (S-3, 60) is an elongated hollow tubular member providing flow of fluid (gas or liquid) there through when connected to the vacuum chamber manifold body.

Figure 2:
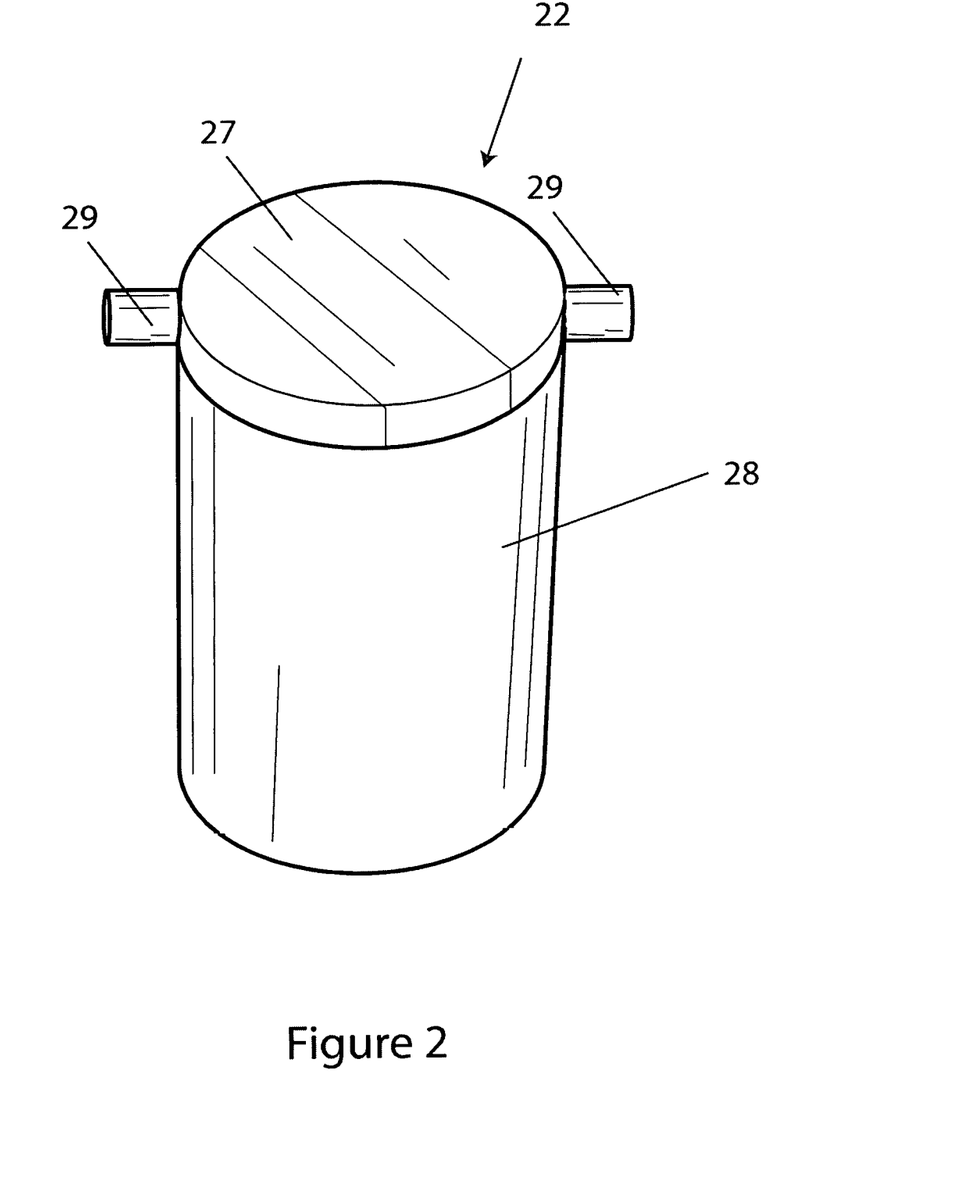
FIG. 2 is a cutaway view of the trap.
Figure 4:
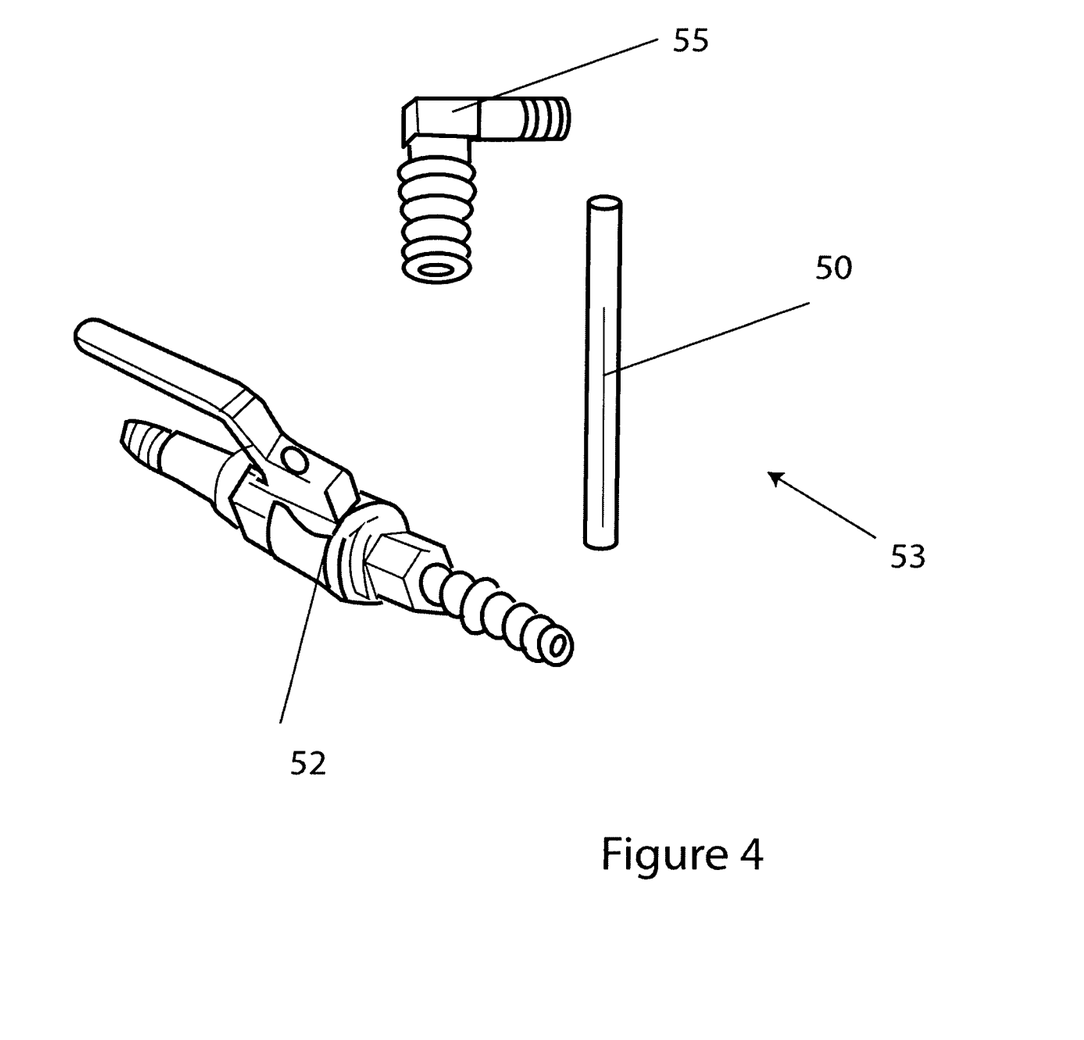
FIG. 4 is a cutaway view of the Dri-Vac Accessory Kit.
Figure 6:
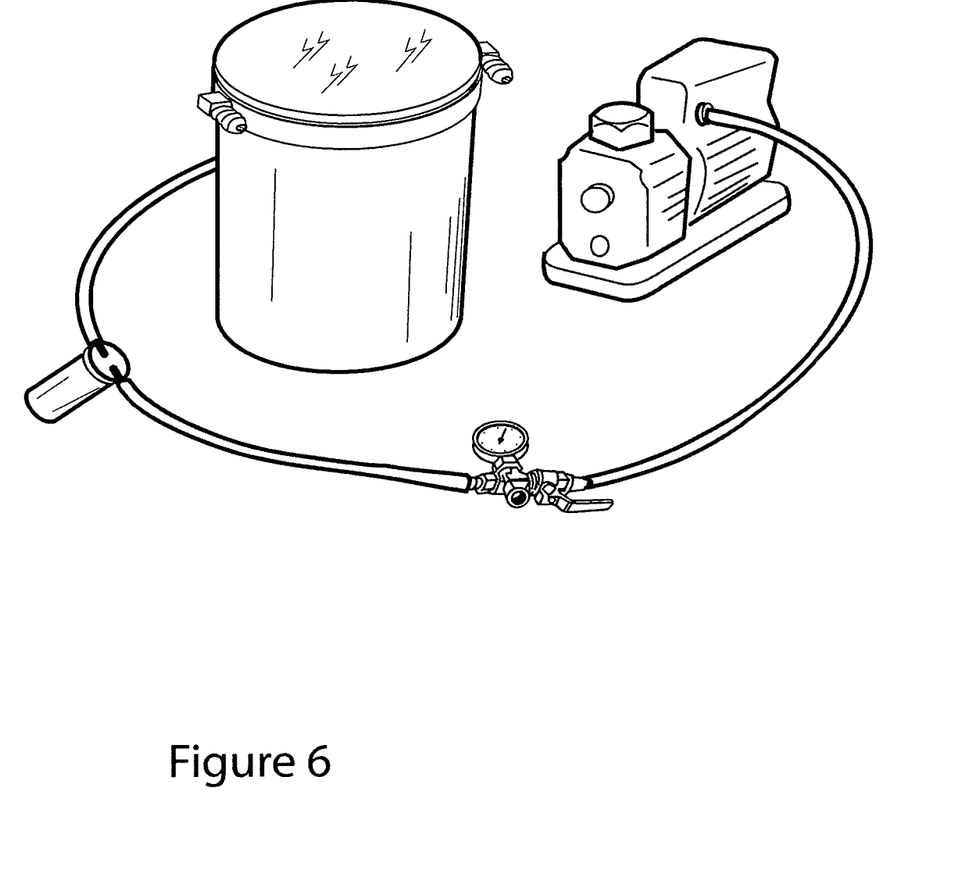
FIG. 6 is a perspective view showing the connections
Figure 7:
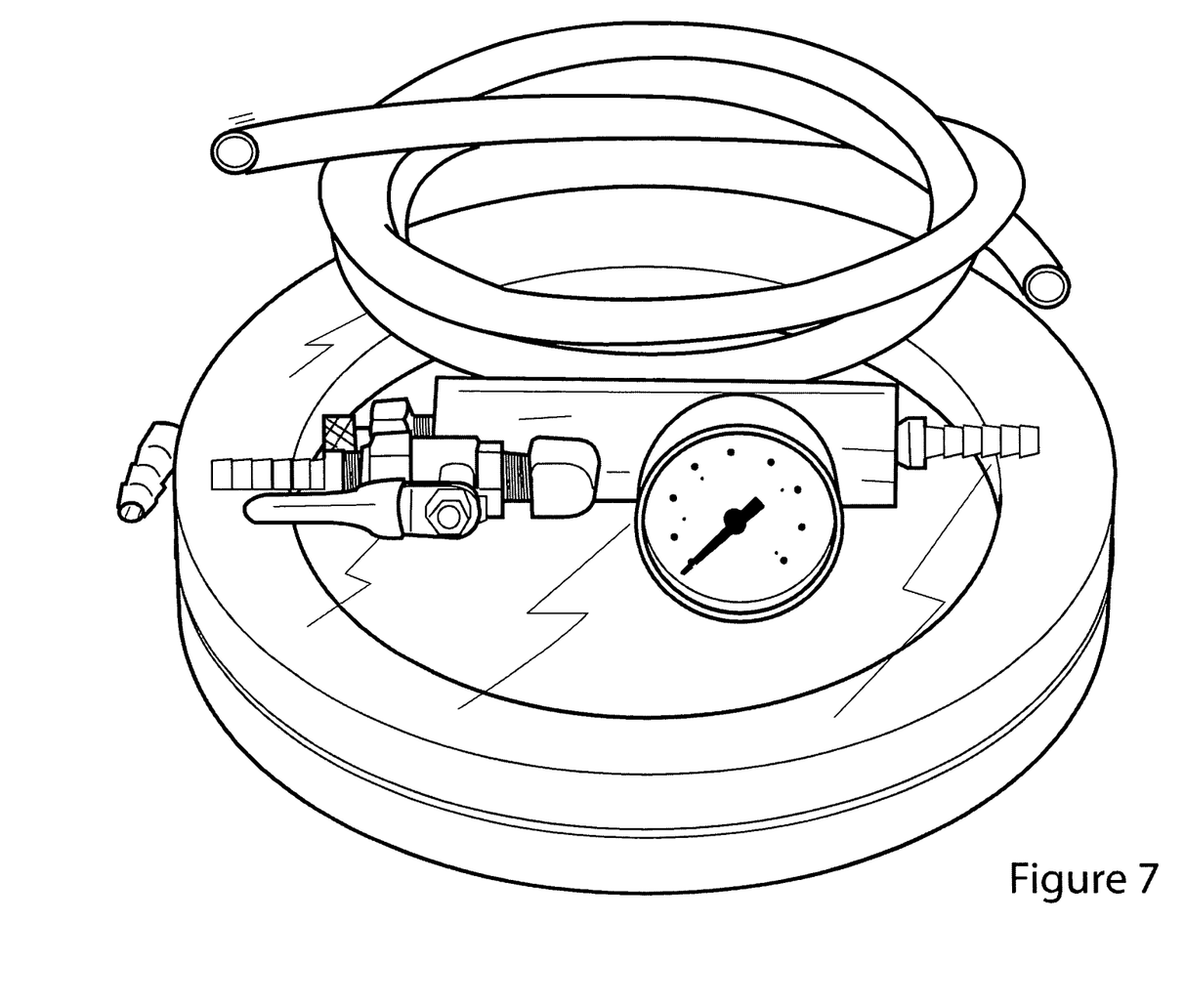
FIG. 7 is a perspective view of on embodiment of the sealing structure

Another accessory illustrated in FIG. 4 is the Dri-Vac (53) accessory kit supports the controls for the air vacuum pump utilized to create the low pressure within the chamber. This system attaches to the chamber to control the amount of liquid into the chamber. Down tube (50) allows the introduction of liquid from a separate container into the chamber. Ball valve (52) is used to control the flow of liquid introduced into the chamber barbed fitting (55) attached to vacuum flange (32). The present invention vacuum flanges (32) support the operational connection with accessories. Resin Trap (GV-5, 22) depicted in FIG. 2 provides the means for catching debris during use thereby eliminating damage to the vacuum chamber (30) and the accessories. As shown in FIG. 6 and FIG. 2, resin trap (22) is a sealed container (28) that is removable coupled with in the hose line (60) between the vacuum gauges (32) and the manifold body (37).

In an alternative embodiment the lid (10) can be manufactured bonded with the annular ring (20) wherein a single unitary piece unit is formed. Additionally, the vacuum pump can be controlled electronically through digital gauges, electronic solenoid and sensors can be operationally added as upgrade accessories to support the operation of vacuum chamber (30).

FIG. 6 shows the interconnections of the system. The hose interconnects the manifold control with the vacuum pump to control the creation the low pressure within the chamber. Resin trap can be inserted between the port and the manifold control. FIG. 1 shows a cross-sectional view of the sealing structure (21). Referring to FIG. 2 there is depicted an embodiment of the resin trap (22). Cap (27) sits upon a chamber. Opposing ports (29) are in fluid communication with tubular hose. As shown in FIG. 9, flange port 32 interconnects with channel 33.

Although the present invention has been described with reference to preferred or exemplary embodiments, those skilled in the art will recognize that various modifications and variations to the same can be accomplished without departing from the spirit and scope of the present invention and that such modifications are clearly contemplated herein. No limitation with respect to the specified embodiments disclosed herein and set forth in the appended claims is entered nor she be inferred.

What is claimed is:

1. A sealing structure used in combination with a vacuum chamber, the sealing structure comprising:
the vacuum chamber having a container with a lid;
the container defined by a bottom wall with a surrounding wall that extends linearly upward to an opening having a pre-determined circumference;
the lid having a complementary configuration to the opening of the container;
the lid and the container being made of a material that can withstand pressurization;
the sealing mechanism having an annular ring with a pre-determined depth;
the annular ring having an opening with a configuration of the pre-determined circumference of the opening of the vacuum chamber;
a top face of the annular ring configured to circumferentially abut and form an airtight seal with the underside of the lid;
a bottom face of the annular ring configured to circumferentially abut and form an airtight seal with the opening of the vacuum chamber;
at least one flange port operationally mounted to an outer wall of the annular ring;
and during pressurization the flange port in fluid communications with the vacuum chamber through a passageway extending therebetween.

2. The sealing structure of claim 1 further comprising:
a top gasket defined by an upper face and a bottom face;
the top gasket having an opening equivalent to the pre-determined circumference the top gasket configured to circumferentially seat between the lid and the top face of the annular ring wherein a vacuum seal is formed.

3. The sealing structure of claim 2 wherein the top gasket is made of elastomer.

4. The sealing structure of claim 1 further comprising: a bottom gasket defined by an upper face and a bottom face;
the bottom gasket having an opening equivalent to the pre-determined diameter of the annular ring;
the bottom gasket configured to circumferentially seat between the opening of the container and the bottom face of the annular ring wherein a vacuum seal is formed.

5. The sealing structure of claim 4 wherein the bottom gasket is made of elastomer.

6. The sealing structure of claim 1 further comprising:
a tubular hosing for interconnecting the flange port to a vacuum pump for pressurization of the vacuum chamber.

7. The sealing structure of claim 6 further comprising a resin trap container operationally mounted along the tubular hosing and seated near the vacuum chamber wherein debris is captured within the resin trap container therein during pressurization.

8. The sealing structure of claim 1 wherein the lid is made of tempered glass.

9. The sealing structure of claim 1 wherein the flange port is vertically mounted to an outer wall of the annular ring and in fluid communications with the vacuum chamber during pressurization.

10. The sealing structure of claim 1 wherein the flange port is horizontally mounted to an outer wall of the annular ring and in fluid communications with the vacuum chamber during pressurization.

11. The sealing structure of claim 1 wherein one end of the tubular hosing is operationally connected to the flange and an opposite end of tubular hosing is connected to a manifold body.

12. The sealing structure of claim 11 wherein the manifold body is operationally connected to a gauge device for displaying the pressure within the vacuum chamber.

13. The sealing structure of claim 11 wherein the manifold body is operationally connected to a relief valve for controlling the pressure within the vacuum chamber.

14. The sealing structure of claim 11 wherein the manifold body is operationally connected to a barb fitting for supporting the connections to the manifold body.

15. The sealing structure of claim 11 wherein the manifold body is operationally connected to a ball valve for controlling the fluid communications within the vacuum chamber.

16. The sealing structure of claim 11 wherein the pre-determined depth of the annular ring is at least 2 inches.

17. The sealing structure of claim 1 wherein the lid and sealing structure is a single unit.

18. The sealing structure claim 1 wherein the annular ring is made of elastomer material.

* * * * *